April 29, 1952 H. C. NOE 2,594,338
ARTICLE DIVERTER
Filed April 15, 1948 2 SHEETS—SHEET 1
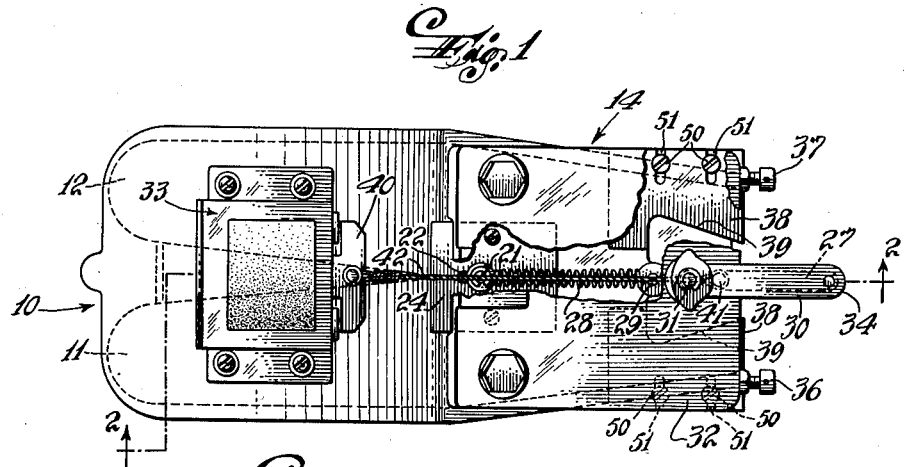
INVENTOR.
Harold C. Noe
BY
Ernest A. Joerren
ATTORNEY April 29, 1952  H. C. NOE  2,594,338
ARTICLE DIVERTER
Filed April 15, 1948  2 SHEETS—SHEET 2

INVENTOR.
Harold C. Noe
BY
Ernest A. Joerren
ATTORNEY

Patented Apr. 29, 1952

2,594,338

UNITED STATES PATENT OFFICE 2,594,338

ARTICLE DIVERTER

Harold C. Noe, Upper Montclair, N. J., assignor to Kidde Manufacturing Co., Inc., Bloomfield, N. J., a corporation of Delaware Application April 15, 1948, Serial No. 21,183

7 Claims. (Cl. 193—31)

The present invention relates to guides for articles and the like, and more particularly to a diverter for alternately directing articles into several paths while the articles are travelling at a relatively high speed.

The present invention aims to provide an improved diverter adapted for use in connection with machines for counting articles such as pills, capsules, tablets, buttons, or other small parts at high speeds wherein a predetermined number of articles is directed into receptacles or containers for packing. In order to facilitate removal of filled receptacles and the replacement of empty receptacles without interrupting the flow of counted articles, such machines are provided with a pair of passages or guideways, each of which is adapted to deliver the articles to a receptacle and are provided with a diverter for alternately directing lots or batches of counted articles into these receptacles. This enables a filled receptacle to be removed and replaced by an empty one while the other receptacle is being filled.

Heretofore, difficulties have been encountered with such high speed machines upon movement of the diverter from one position to another to direct the articles. Due to the inability of the diverter to handle articles travelling at high speeds, one or more articles were improperly directed during the switching movement of the diverter whereby the number of articles delivered to the receptacles was inaccurate and other than the predetermined number. Also, during movement of the diverter, articles contacted the diverter in a manner to cause damage to or breakage of the articles. This resulted in packaging an insufficient number of articles in perfect condition together with broken parts and fragments of articles.

Accordingly, an object of the present invention is to eliminate the foregoing difficulties and objections.

Another object is to provide a diverter suitable for use in connection with high speed counting machines.

Another object is to provide a diverter which will not damage or destroy the articles directed thereby.

Another object is to provide a diverter which can be rapidly moved from one position to another.

Another object is to provide a diverter which is simple in construction and highly effective and reliable in operation.

A further object is to provide a method of diverting articles travelling at a high rate of speed.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by the provision of a diverter for alternately directing articles into one of a pair of guideways, the diverter being constructed and arranged to move in substantially the same direction and at substantially the same speed as the articles being diverted while it is switched from one position to another.

A preferred embodiment of the invention has been chosen for purposes of illustration and description, and is shown in the accompanying drawings, forming a part of the specification, wherein:

Figure 1 is a plan view of a diverter in accordance with the invention, the diverter blade being shown in a central non-operating position to facilitate illustration.

Figure 2 is a sectional view taken substantially along the line 2—2 on Figure 1.

Figure 3 is a sectional view taken along the line 3—3 on Figure 2.

Figure 4:
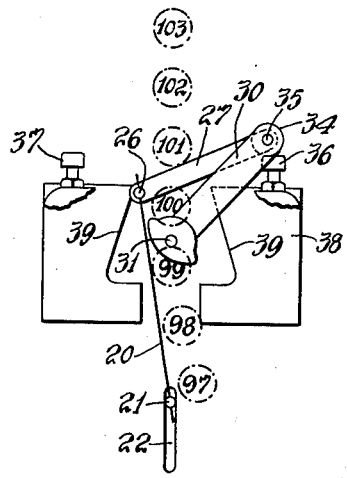

Figures 4 to 9, inclusive, are schematic plan views illustrating the operation of the diverter shown in Figures 1 to 3.

Referring to the drawings and more particularly to Figures 1, 2 and 3, there is shown the upper end of a tube 10 having a pair of passages 11 and 12 for delivering counted articles to containers, and a diverter 14, in accordance with the invention, for alternately directing the articles to either of the passages.

The upper end of the tube 10, as shown in Figure 2, curves from a substantially horizontally extending position towards a vertically downwardly extending position, and has an opening 15 for receiving the counted articles and has a chamber 16 adjacent the opening wherein a deflector is mounted, as about to be described. A partition 17, commencing at the inner end of the chamber 16, divides the tube into the passages 11 and 12.

The diverter comprises a deflector in the form of a thin blade 20, a pin 21 having its lower end secured to the blade at the upper edge adjacent the inner end thereof and having its upper end slidably mounted in a slot 22 formed in a plate 24 secured over an opening 25 in the chamber 16, and a pin 26 having its lower end secured to the blade at the upper edge adjacent the outer end thereof, the pin 26 being rotatably supported by a frame or link 27 constituting an element of a toggle arrangement about to be described. A coiled spring 28 having one end secured to the upper end of the pin 21 and having its other end secured to a pin 29 mounted on the tube 10 normally urges the blades 20 towards the opening 15.

The toggle further comprises an arm or line 30 pivotally supported at one end by a vertical pin 31 mounted on a horizontal bracket 32 supported on the tube 10 and having a depending portion 34 at the other end, and the frame 27 which has its outer end pivotally mounted on a pin or shaft 35 supported by the depending portion 34 of the arm 30.

The extent of pivotal movement of the arm 30 is determined by adjustable stops such as the heads 36 and 37 of a pair of members each screw threaded into the forward end bracket 32 at one side of the pin 31. The extent of pivotal movement of the frame 27 is determined by a pair of cam plates 38 each adjustably secured to bracket 32 at one side of the pin 31 by screws 50 extending through slots 51 therein, and each having an inwardly diverging surface 39 (Figure 1) adapted to be engaged by the pin 26 on the frame 27 to serve as a guide therefor during movement of the blade toward the opening 16 under the influence of the spring 28. By varying the distance between the cam plate surfaces 39, the amplitude of the movement of the switch blade is adjusted.

The diverter, as just described, is adapted to be moved from side to side in the chamber to alternately direct articles into each of the passages 11 and 12, while simultaneously being moved rearwardly or away from the opening, and is then adapted to be moved forwardly by the spring 28. In order to accomplish such switching movement, the frame 27 is subjected to a sudden rearward force which, as illustrated herein, may be supplied by a quick acting solenoid 33 mounted on the tube 10 having its armature 40 connected to a stud 41 on the frame 27 by a cable 42 or other suitable member. After energization of the solenoid has ceased, the armature may be returned to its normal forward position by a coiled spring 44 having one end secured to the armature and having its other end extending through an aperture 45 in the rear end of the fixed plate 24.

The operation of the diverter, in connection with controlling the path to be followed by articles which have just been counted, is illustrated schematically in Figures 4 to 9. In these views, the articles are illustrated as being counted in lots of a hundred, one lot being directed to the passage 11, the next lot being directed to the passage 12, the next lot being directed to the passage 11, and so on. The articles of each lot are serially numbered. The articles of the first lot are numbered from 1 to 100 (only articles 97 to 100 being shown in Figures 4 to 6), the articles of the second lot are numbered from 101 to 200 (only articles 101 to 103 being shown in Figures 4 to 6 and only articles 197 to 200 being shown in Figures 7 to 9), and the articles of the third lot are numbered from 201 to 300 (only articles 201 to 203 being shown in Figures 7 to 9).

Referring to Figure 4, the diverter is shown with the blade 20 in position to direct the articles 97 to 100 of the first lot into the passage 11. When in this position, the arm 30 extends towards the right with the depending portion 34 thereof engaging the head 36 of the stop. The pin 26 of the frame 27 engages the cam surface 39 at the left so that the front edge of the blade 20 extends towards the left to direct the articles to the passage 11 on the right, and the pin 21 is held in the forward end of the slot 22 by the spring 28 (Figure 2).

When the articles are in relation to the diverter as shown, it is desired to move the blade 20 towards the right so that articles 101 to 103 (and up to 200) are directed into the passage 12. This is accomplished by energizing the solenoid momentarily thereby causing the armature 40 thereof to pull the cable 42 which in turn pulls the frame 27 rearwardly to move the blade as about to be described.

Figure 5:
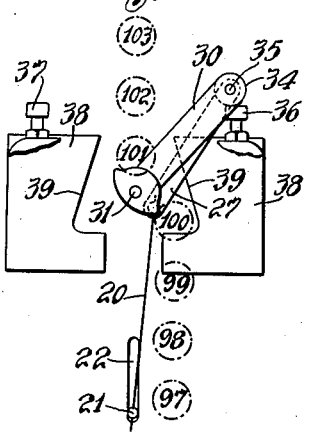

The blade, in moving to the position shown in Figure 5, is first moved rearwardly very rapidly and at about as fast as the articles are travelling as they enter the opening 15 of the chamber 16, and the front edge of the blade is swung slightly towards the right about the pin 21 as the frame 27 pivots about the pin 35 of the toggle connection and the pin 21 slides rearwardly in the slot 22. This enables the front edge of the blade to be moved across the path of article 101 with a rearward, sideward motion to prevent the article 101 from contacting the front edge of the blade and being damaged, while at the same time the blade urges the articles 97 to 100 already directed thereby towards the passage 11.

Figure 6:
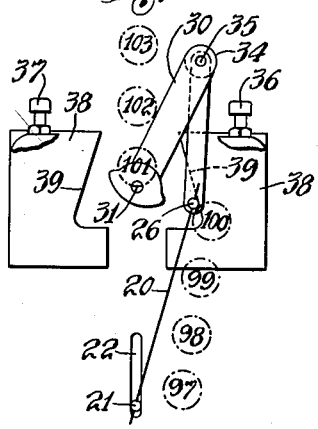

In Figure 6, the blade and associated elements are shown immediately after rearward movement has been effected and the frame 27 being moved under the influence of its inertia to swing the blade further towards the right until the pin 26 contacts the cam surface 39 at the right. The pin 21 lingers in the rear of the slot 22 momentarily while the toggle action of the frame 27, the blade 20 and arm 30 is effective to swing the arm towards the left and away from the stop head 36. The front edge of the blade is now fully to the right of article 101 to enable it and the succeeding articles 102, 103 to 200 to be directed into the passage 12.

Figure 7:
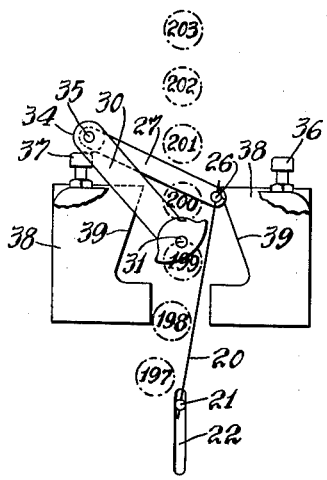
Figure 8:
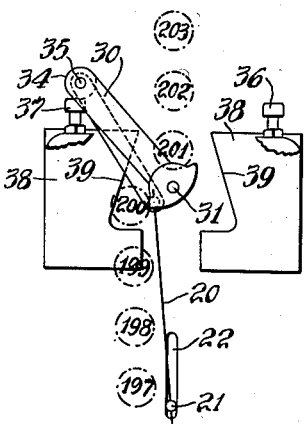
Figure 9:
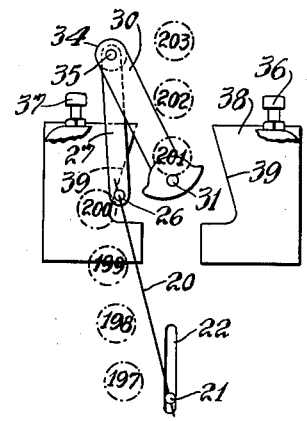

As the solenoid is rendered ineffective the spring 28 moves the pin 21 forwardly in the slot 22 to carry the blade forwardly with the pin 26 being guided forwardly by the cam surface 39 on the right until the depending portion 34 of the arm engages the stop head 37 and the elements assume the positions shown in Figure 7.

In Figure 7, the articles of the second lot are shown just after the last article thereof (200) has been directed towards the passage 12 and the first article (201) of the third lot approaches. The elements of the diverter are in the opposite position as shown in Figure 4 and upon energization of the solenoid move similarly, but oppositely, as described in connection with Figures 4 to 6, through the positions shown in Figures 8 and 9 and return to the position shown in Figure 4.

From the foregoing description, it will be seen that the present invention provides an improved diverter for alternately directing rapidly moving articles into a pair of paths without damaging the articles.

The diverter is simple in construction, rapid and reliable in operation and can readily withstand such rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

A counting machine, in which the article diverter is adapted to be embodied, is illustrated in my copending application for United States Letters Patent, Serial No. 762,018, filed July 19, 1947, issued on even date herewith.

I claim:

1. In a diverter, the combination of guideway means defining a pair of paths into which articles are adapted to be directed, a deflector extending longitudinally in said guideway means adapted to be moved from one position to another to selectively direct the articles into said paths and having its trailing end adjacent said paths, means providing an elongate slot extending longitudinally with respect to said guideway means, an element on said deflector adjacent its trailing end slidably positioned in said slot and providing for pivotal and lineal movement of said deflector with respect to said slot, mechanism operable for effecting lineal movement of said deflector, and means connected with the leading end of said deflector for effecting pivotal movement of said deflector upon lineal movement thereof.

2. In a diverter, the combination of guideway means defining a pair of paths into which articles are adapted to be directed, a deflector extending longitudinally in said guideway means adapted to be moved from one position to another to selectively direct the articles into said paths and having its trailing end adjacent said paths, means providing an elongate slot extending longitudinally with respect to said guideway means, an element on said deflector adjacent its trailing end slidably positioned in said slot and providing for pivotal and lineal movement of said deflector with respect to said slot, linkage means pivotally mounted at one end thereof and pivotally connected at the other end to said deflector adjacent its leading end, mechanism operable for effecting lineal movement of said deflector in a direction toward said paths, and resilient means operable for urging said deflector in an opposite direction when said mechanism is ineffective.

3. A diverter according to claim 2, wherein said linkage means is a toggle joint including a pair of links one of which is pivotally connected to said deflector, and means operatively connecting said last mentioned link to said mechanism.

4. A diverter according to claim 2, wherein said mechanism includes momentarily operable electromagnetic means.

5. In a diverter, the combination of guideway means having a pair of passages into which articles are adapted to be directed, a deflector extending longitudinally in said guideway means adapted to be moved from one position to another to selectively direct the articles into said passages and having its trailing end adjacent the entrance to said passages, means providing an elongate slot extending longitudinally with respect to said guideway means, a pin connected to said deflector adjacent its trailing end and rotatably and slidably positioned in said slot to mount said deflector for pivotal and lineal movement, an arm pivotally mounted at one end thereof, a link having one end pivotally connected to the other end of said arm and having its other end pivotally connected to said deflector adjacent its leading end, mechanism operable for lineally moving said deflector towards said passages, and a spring for urging said deflector in an opposite direction when said mechanism is ineffective.

6. In a diverter, the combination of guideway means having a pair of passages into which articles are adapted to be directed, a deflector extending longitudinally in said guideway means adapted to be moved from one position to another to selectively direct the articles into said passages and having its trailing end adjacent the entrance to said passages, means providing an elongate slot extending longitudinally with respect to said guideway means, a pin connected to said deflector adjacent its trailing end and rotatably and slidably positioned in said slot to mount said deflector for pivotal and lineal movement, an arm pivotally mounted at one end thereof, a link having one end pivotally connected to the other end of said arm and having its other end pivotally connected to said deflector adjacent its leading edge, mechanism operable for lineally moving said deflector towards said passages, a spring for urging said deflector in an opposite direction when said mechanism is ineffective, and a pair of guide members each disposed at one side of said link and having surfaces positioned to be engaged by said link to guide the same, said surfaces converging inwardly in a direction forwardly of the leading end of said deflector.

7. In a diverter according to claim 6, wherein said mechanism includes momentarily operable electromagnetic means.

HAROLD C. NOE.

REFERENCES CITED

The following references are of record in the file of this patent:

UNITED STATES PATENTS

| Number | Name | Date |
|---|---|---|
| 1,391,195 | Ladd | Sept. 20, 1921 |
| 1,735,825 | Koch | Nov. 12, 1929 |
| 2,037,931 | Schmidt | Apr. 21, 1936 |
| 2,066,869 | Wild | Jan. 5, 1937 |
| 2,235,286 | Cookson | Mar. 18, 1941 |